(No Model.)

J. P. MANNY.
LEMON JUICE EXTRACTOR.

No. 408,121. Patented July 30, 1889.

Attest.
A. O. Behel.
E. Behel.

Inventor.
John P. Manny.
Per Jacob Behel.
Atty.

United States Patent Office.

JOHN P. MANNY, OF ROCKFORD, ILLINOIS.

LEMON-JUICE EXTRACTOR.

SPECIFICATION forming part of Letters Patent No. 408,121, dated July 30, 1889.

Application filed October 7, 1887. Renewed March 9, 1889. Serial No. 302,744. (No model.)

*To all whom it may concern:*

Be it known that I, JOHN P. MANNY, a citizen of the United States, residing in the city of Rockford, county of Winnebago, and State of Illinois, have invented certain new and useful Improvements in Lemon-Juice Extractors, of which the following is a specification.

The object of this invention is the extraction of the juice from lemons, oranges, or other similar fruits in a manner to exclude the oil or other objectionable matter contained in the rind, and also to separate the juice from the seeds and the indigestible fibrous or pithy matter contained in the fruit.

To this end I have designed and constructed the device represented in the accompanying drawings, in which—

Figure 1:
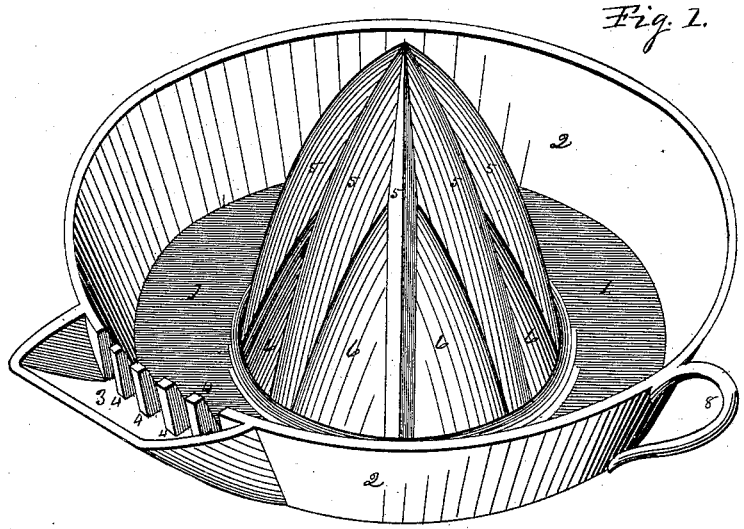
Figure 2:
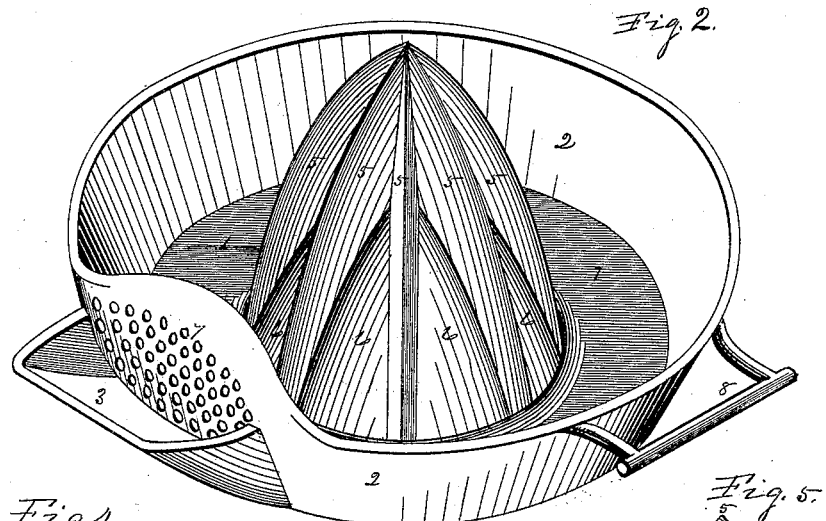
Figure 4:
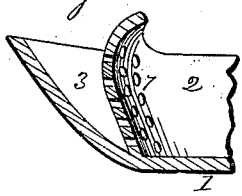
Figure 3:
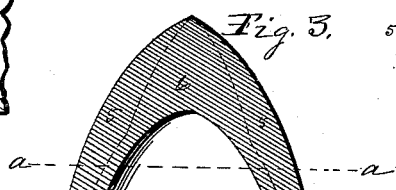
Figure 5:
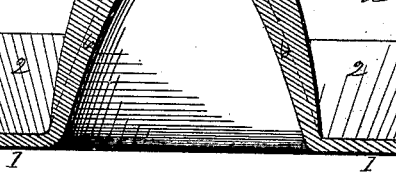

Figure 1 is an isometrical representation of my improved juice-extractor. Fig. 2 is also an isometrical representation of my improved juice-extractor, showing a well-known practical form of strainer. Fig. 3 is a vertical central section of Fig. 1 cut centrally through the strainer. Fig. 4 is a vertical central section of the strainer of Fig. 2, and Fig. 5 is a horizontal section of the ribbed extractor on dotted line $a$ on Fig. 3.

The reservoir base portion of my improved extractor is of cup form, consisting of a bottom 1 and an uprising and outwardly-flaring side wall 2, in which is formed a discharge-spout 3, projecting outward from the side wall 2. Fingers 4 rise at proper intervals from the inner face of the discharge-spout, and serve as a strainer to retain within the cup the seeds and fibrous and pithy matter cut from the fruit in extracting the juice. A ribbed extractor, preferably of hyperbolic outline form, rises centrally from the inner face of the bottom 1 of the cup-formed reservoir, and the ribs 5 of the extractor radiate from its hollow base portion 6. (Shown in Figs. 1 and 2, and in vertical central section in dotted outline in Fig. 3, and in transverse section in Fig. 5.)

The extractor proper, which uprises from the bottom of the cup, is preferably formed integral therewith, as shown in the drawings, and when the extractor is formed of glass (the material which I find it expedient in general to use) the central portion of the material at the bottom of the cup is developed into the extractor proper, leaving the extractor proper hollow and open at its base. This construction not only saves material, but admits of the successful pressing of the molten glass into the grooves of the mold to form well-defined sharpened ribs.

In Figs. 2 and 4 I have shown a well-known form of strainer 7, consisting of a perforated portion of the side wall of the cup, which may be employed instead of the fingers 4 shown in Fig. 1; but, instead of the fingers 4 shown in Fig. 1 or the perforated side wall shown in Fig. 2, other known forms of strainers may be employed in connection with my improved juice-extractor and still be within the scope of my invention.

In use I prefer to cut the lemon or other fruit about the center of its length, preferably at a right angle to its polar axis, and then press its cut surface on the apex of the ribbed extractor in the direction of the polar axis of both the extractor and of the fruit, and in subjecting it to its axial or endwise pressure to impart to it a rotary or oscillatory movement on the extractor, which will separate the juice from the fruit without extracting the oil or other objectionable substances from the rind, and the juices and other matter extracted from the fruit will be received in the cup-formed reservoir, to be discharged therefrom through the strainer to separate it from the seeds and other substances extracted from the fruit.

It will be seen that by reason of the many-ribbed extractor but a slight oscillatory movement of the fruit thereon will be required to extract the juice, which greatly lessens the labor and lessens the tendency to remove the pithy matter from the fruit.

As a matter of convenience I prefer to provide my improved juice-extractor with a handle 8, which may be any of the known varieties capable of use in connection with my improved extractor.

I claim as my invention—

1. A lemon-juice extractor consisting, essentially, of a reservoir-base having a strainer located at the side of the reservoir, a tapered extractor uprising from and formed integral with the bottom of the reservoir-base, the exterior surface of the extractor provided with projections, substantially as set forth.

2. A lemon-juice extractor consisting, essentially, of a reservoir-base having a spout, a strainer located at the side of the reservoir, a handle, and a tapered extractor uprising from and formed integral with the bottom of the reservoir-base, the exterior surface of the extractor provided with projections, substantially as set forth.

3. A juice-extractor consisting, essentially, of a ribbed extractor, a reservoir-base forming a support for the extractor, a discharge-spout connected with the side walls of the reservoir, and fingers rising within the discharge-spout to operate as a strainer, substantially as set forth.

JOHN P. MANNY.

Witnesses:
JACOB BEHEL,
A. O. BEHEL.